United States Patent
Warmsley et al.

(10) Patent No.: US 11,507,609 B1
(45) Date of Patent: Nov. 22, 2022

(54) SYSTEM FOR GENERATING TOPIC-BASED SENTIMENT TIME SERIES FROM SOCIAL MEDIA DATA

(71) Applicant: HRL Laboratories, LLC, Malibu, CA (US)

(72) Inventors: Dana M. Warmsley, Westlake Village, CA (US); Philip Pope, Los Angeles, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 490 days.

(21) Appl. No.: 16/752,562

(22) Filed: Jan. 24, 2020

Related U.S. Application Data (60) Provisional application No. 62/815,239, filed on Mar. 7, 2019.

(51) Int. Cl.
*G06F 16/33* (2019.01)
*G06Q 50/00* (2012.01)

(52) U.S. Cl.
CPC ...... *G06F 16/3334* (2019.01); *G06F 16/3347* (2019.01); *G06Q 50/01* (2013.01)

(58) Field of Classification Search
CPC .................................................. G06F 16/3334
See application file for complete search history.

(56) References Cited

U.S. PATENT DOCUMENTS

2009/0319342 A1* 12/2009 Shilman ............. G06Q 30/02
705/7.41

OTHER PUBLICATIONS

Adhikari, Ratnadip et al., "An Introductory Study on Time Series Modeling and Forecasting", 2013, 67 pages, arXiv preprint arXiv: 1302.6613.
Blei, David M. et al., "Latent Dirichlet Allocation", Journal of Machine Learning Research, Jan. 2003, pp. 993-1022.
Faris, Robert et al., "Partisanship, Propaganda, and Disinformation: Online Media and the 2016 U.S. Presidential Election," Research Publication No. 2017-6, Aug. 2017, 142 pages, Berkman Klein Center for Internet & Society at Harvard University.

(Continued)

*Primary Examiner* — Van H Oberly
(74) *Attorney, Agent, or Firm* — Lewis Roca Rothgerber Chrisite LLP (57) ABSTRACT

A method for issuing control signals in response to sentiment. In some embodiments, the method includes: assigning, to each of a plurality of comments, a respective topic vector of length k; determining whether a largest element of the topic vector of a first comment of the plurality of comments exceeds a weight threshold; in response to the determining that the largest element exceeds the weight threshold, classifying the first comment into a first topic, of k topics, the first topic corresponding to the position, in the topic vector, of the largest element of the topic vector; calculating a first sentiment score; calculating an average sentiment score, based in part on the first sentiment score; determining whether the average sentiment score meets a criterion; and in response to the determining that the criterion is met, generating a control signal, the control signal including a message related to the first topic.

18 Claims, 8 Drawing Sheets

(56) References Cited

OTHER PUBLICATIONS

Hutto, C.J. et al., "VADER: A Parsimonious Rule-based Model for Sentiment Analysis of Social Media Text", Eighth International Conference on Weblogs and Social Media (ICWSM-14), 2014, 10 pages, Association for the Advancement of Artificial Intelligence.
Wang, KE et al., "SentiGAN: Generating Sentimental Texts via Mixture Adversarial Networks", Proceedings of the Twenty-Seventh International Joint Conference on Artificial Intelligence (IJCAI-18), 2018, pp. 4446-4452.
Website: "Clustering—RDD-based API", Apache Spark 2.4.5, printed Apr. 30, 2020, 13 pages, https://spark.apache.org/docs/latest/mllib-clustering.html.

* cited by examiner

| Subreddits |
|---|
| politics, worldnews, The Donald |
| EnoughTrumpSpam, news, PoliticalDiscussion, guns |
| HillaryForPrison, Libertarian, askhillarysupporters |
| MensRights, hillaryclinton, worldpolitics |
| Political Revolution, Conservative, AskTrumpSupporters, ukpolitics |
| BernTheConvention, AskBernieSupporters, SandersForPresident |
| HillaryForAmerica, NeverTrump, worldpolitics |
| NeutralPolitics, Ask Politics, gunpolitics |
| IDontLikeRPolitics, moderatepolitics, AustralianPolitics |

SYSTEM FOR GENERATING TOPIC-BASED SENTIMENT TIME SERIES FROM SOCIAL MEDIA DATA

CROSS-REFERENCE TO RELATED APPLICATION(S)

The present application claims priority to and the benefit of U.S. Provisional Application No. 62/815,239, filed Mar. 7, 2019, entitled "SYSTEM FOR GENERATING TOPIC-BASED SENTIMENT TIME SERIES FROM SOCIAL MEDIA DATA", the entire content of which is incorporated herein by reference.

FIELD

One or more aspects of embodiments according to the present disclosure relate to social media analysis, and more particularly to a system and method for analyzing social media data for sentiment.

BACKGROUND

Social media, in which large numbers of users may actively participate by posting comments, observations, and opinions, are a potentially valuable source of information about public sentiment regarding a variety of topics. Researchers doing market research may wish to analyze such data to assess demand for certain products, services, or features, and public relations professionals may wish to monitor such data to detect, for example, an abrupt increase in negative sentiment about a product or client, that may signal the need to initiate a public relations campaign.

The volume of social media data available on line may be very large, and it may be advantageous to analyze data sets of significant size, so that the conclusions drawn about public sentiment from the data may be reliable. Human review of social media postings may be impractical for this reason; moreover, human review may be unreliable in part because of the difficulties in eliminating, in human reviewers, the effects of bias and subjective interpretation.

Thus, there is a need for a machine-based system for analyzing social media data for sentiment.

SUMMARY

According to some embodiments of the present invention, there is provided a method for issuing control signals in response to sentiment, the method including: assigning, to each of a plurality of comments, a respective topic vector of length k, k being a positive integer; determining whether a largest element of the topic vector of a first comment of the plurality of comments exceeds a weight threshold; in response to the determining that the largest element exceeds the weight threshold, classifying the first comment into a first topic, of k topics, the first topic corresponding to the position, in the topic vector, of the largest element of the topic vector; calculating a first sentiment score for the first comment; calculating an average sentiment score, based in part on the first sentiment score; determining whether the average sentiment score meets a criterion; and in response to the determining that the average sentiment score meets the criterion, generating a control signal, the control signal including a message related to the first topic.

In some embodiments, the method further includes: classifying a second comment into the first topic; and calculating a second sentiment score for the second comment.

In some embodiments, the method further includes displaying a graph of sentiment as a function of time for the first topic, the graph including: the first sentiment score at a time associated with the first comment, and the second sentiment score at a time associated with the second comment.

In some embodiments, the assigning, to each of the plurality of comments, of the respective topic vector of length k, includes fitting the comments with a topic model.

In some embodiments, the topic model is Latent Dirichlet Allocation.

In some embodiments, k is between 30 and 75.

In some embodiments, the weight threshold is between 0.1 and 0.6.

In some embodiments, the calculating of the first sentiment score for the first comment includes calculating the first sentiment score with VADER.

According to some embodiments of the present invention, there is provided a system for analyzing sentiment, the system including a processing circuit configured to: assign, to each of a plurality of comments, a respective topic vector of length k, k being a positive integer; determine whether a largest element of the topic vector of a first comment of the plurality of comments exceeds a weight threshold; in response to the determining that the largest element exceeds the weight threshold, classify the first comment into a first topic, of k topics, the first topic corresponding to the position, in the topic vector, of the largest element of the topic vector; and calculate a first sentiment score for the first comment; calculate an average sentiment score based in part on the first sentiment score; determine whether the average sentiment score meets a criterion; and in response to the determining that the average sentiment score meets the criterion, send a message related to the first topic.

In some embodiments, the processing circuit is further configured to: classify a second comment into the first topic; and calculate a second sentiment score for the second comment.

In some embodiments, the processing circuit is further configured to display a graph of sentiment as a function of time for the first topic, the graph including: the first sentiment score at a time associated with the first comment, and the second sentiment score at a time associated with the second comment.

In some embodiments, the assigning, to each of the plurality of comments, of the respective topic vector of length k, includes fitting the comments with a topic model.

In some embodiments, the topic model is Latent Dirichlet Allocation.

In some embodiments, k is an input parameter to the topic model.

In some embodiments, k is between 30 and 75.

In some embodiments, the weight threshold is between 0.1 and 0.6.

In some embodiments, the calculating of the first sentiment score for the first comment includes calculating the first sentiment score with VADER.

According to some embodiments of the present invention, there is provided a non-transitory computer readable medium upon which are encoded instructions that, when executed by a processing circuit, cause the processing circuit to: assign, to each of a plurality of comments, a respective topic vector of length k, k being a positive integer; determine whether a largest element of the topic vector of a first comment of the plurality of comments exceeds a weight threshold; in response to the determining that the largest element exceeds the weight threshold, classify the first comment into a first topic, of k topics, the first topic corresponding to the position, in the topic vector, of the largest element of the topic vector; calculate an average sentiment score for a plurality of comments including the first comment; determine whether the average sentiment score meets a criterion; and in response to the determining that the average sentiment score meets the criterion, send a message related to the first topic.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for analyzing social media data for sentiment provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
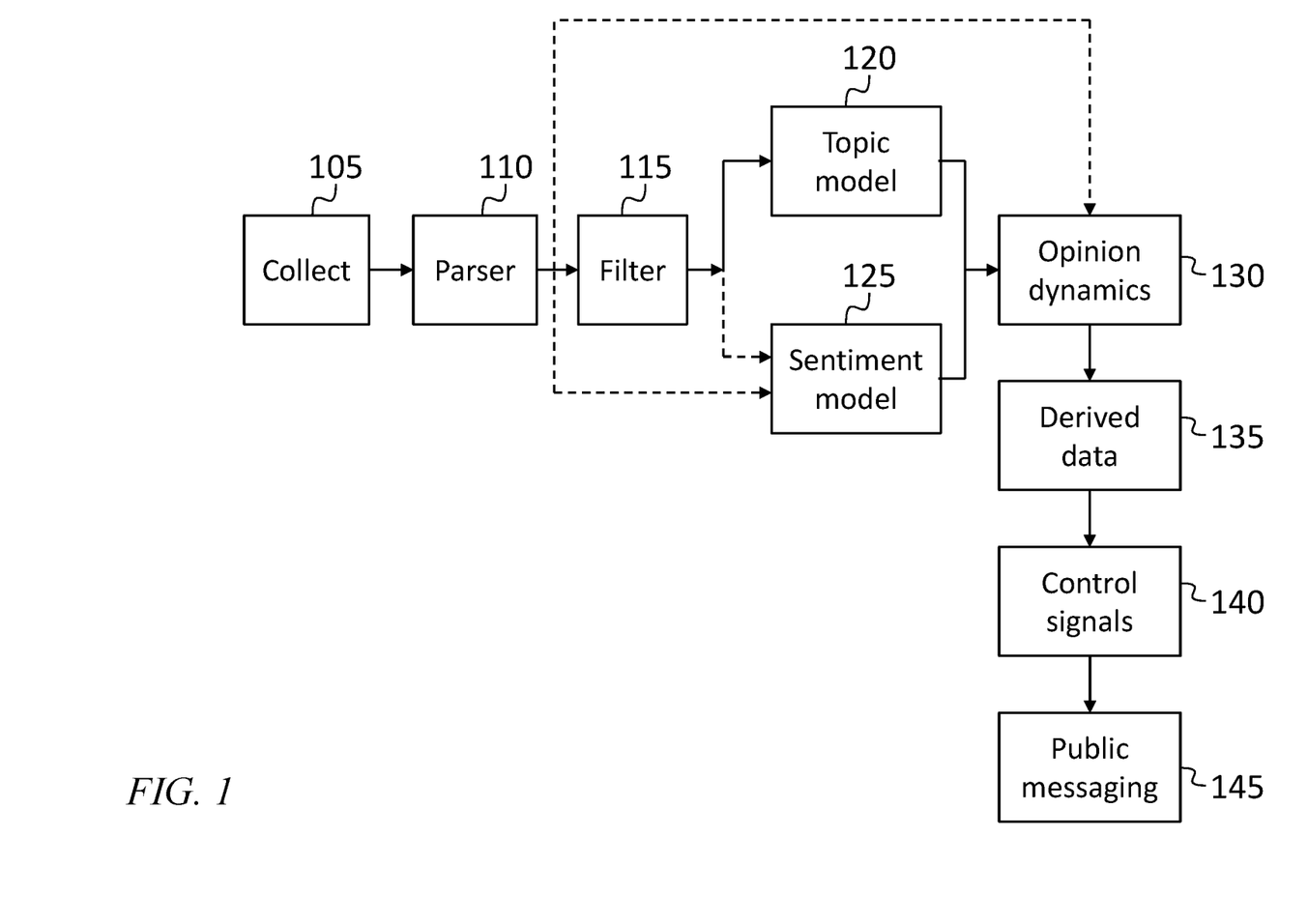
FIG. 1 is a block diagram, according to an embodiment of the present disclosure.

FIG. 1 shows a schematic block diagram for a system and method for analyzing social media data for sentiment. In the system, as discussed in further detail below, raw social media data is preprocessed and ingested into the sentiment and topic models, and outputs are collected into the model of opinion dynamics, which result in derived data. The derived data is then used to build application specific control signals.

In a first act 105, raw data are collected. The raw data may be obtained from any of various suitable sources, such as web sites on which users may post comments, such as Reddit (reddit.com). The data may be downloaded directly if the web site makes the data available in this form, or a suitable web client, which may send suitable http get and post requests for fetching the data, in the same manner as a browser operated by human user would, may be employed.

The raw data may include (e.g., consist of) one or more text strings, each including one or more postings or "messages". Each message may be a text string which may include (i) a comment (which may be text typed by a user, expressing, e.g., an opinion), (ii) a time at which the comment was posted, and (iii) a user identifier (ID) identifying a user who posted the comment. The volume of data may be sufficiently great that processing of the data by humans, in the manner described herein, would not be feasible. As discussed in further detail below, in some embodiments researchers may leverage discussions that take place on social media. In particular, researchers may identify (using the methods of some embodiments disclosed herein) messages related to their topic or topics of interest and analyze each comment in such a message to determine the sentiment of the comment. Sentiment at the comment level may be computed by aggregating the sentiment of each word in the comment. Then, public sentiment may be assessed by aggregating sentiment across all comments. As used herein, a "topic" is a semantic classification performed by a topic model, and, as such, classification into topics may in general be different from the semantic classification performed by users or administrators of some social media web sites, such as the classification into subreddits (mentioned below) of discussion threads on Reddit.

In a second act 110, the raw data set may be parsed to extract, from each message, a tuple including (e.g., consisting of) a user ID (of the user who made the posting), a timestamp (i.e., the date and time of the posting), and a comment (the comment being unstructured text). The extracting may be performed by a suitable parser, which may analyze the structure of a document (e.g., a web page showing a plurality of comments that are part of a thread) to identify where each new message begins, and to identify, within each message, the user ID, timestamp, and comment. If raw html is available for the web page, then the document object model of the web page may, if it contains information relevant for parsing, be analyzed and used to separate messages and the components of each message. In mathematical notation, the output of the parser may, as mentioned above, be a set of m tuples $(u_i, t_i, c_i)$, m being the number of postings in the raw data, each tuple including the user ID $u_i$ for the $i^{th}$ posting, the date and time, $t_i$, when the $i^{th}$ posting was made, and the comment $c_i$ of the $i^{th}$ posting.

Further, the comments resulting from the parsing 110 may be filtered at 115 to remove stop words and punctuation from each comment. Stop words are words that occur quite frequently in or throughout a set of documents (e.g., "the", "an", "be"). In general, these terms may serve little purpose in determining the topic or sentiment of a comment and their removal may both increase the accuracy of the topic model and sentiment analysis model and reduce the memory needed to run the system.

Figure 2A:
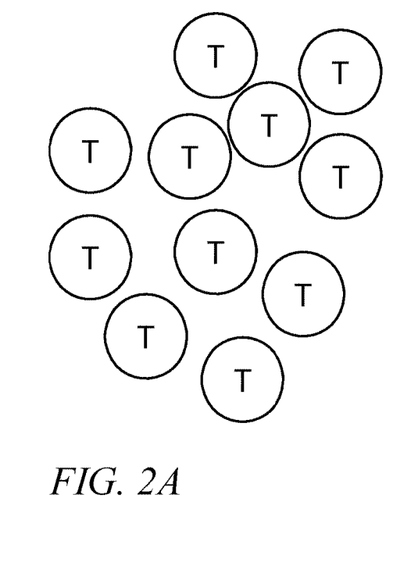
FIG. 2A illustrates a set of topics, according to an embodiment of the present disclosure.
Figure 2B:
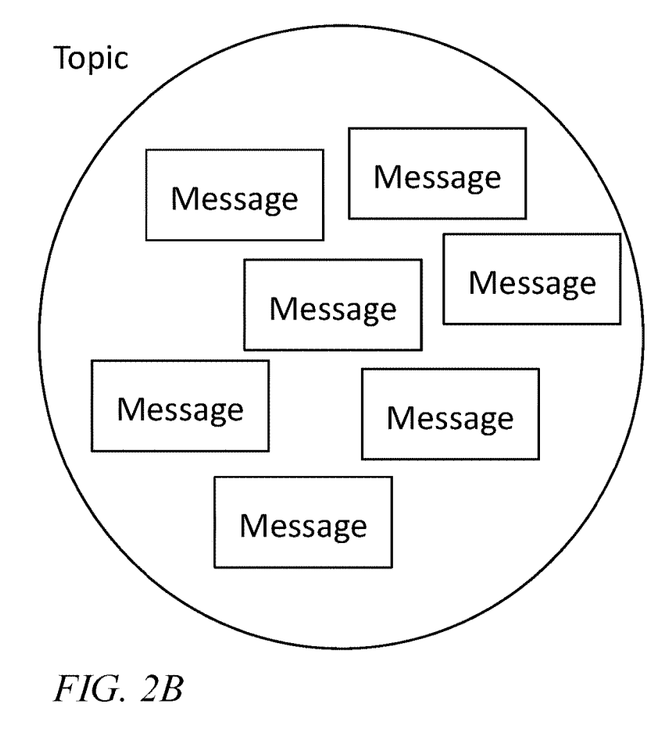
FIG. 2B illustrates a plurality of messages in a topic, according to an embodiment of the present disclosure.
Figure 2C:
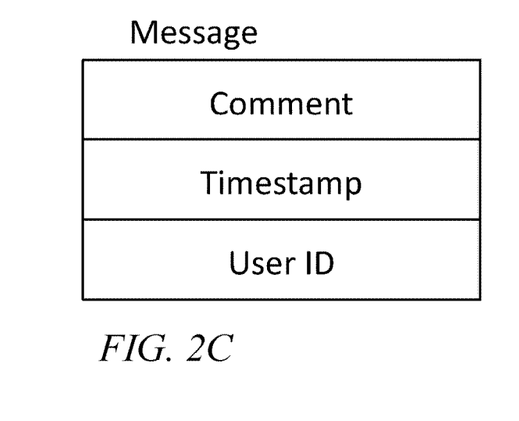
FIG. 2C illustrates the contents of a message, according to an embodiment of the present disclosure.
Figure 3:
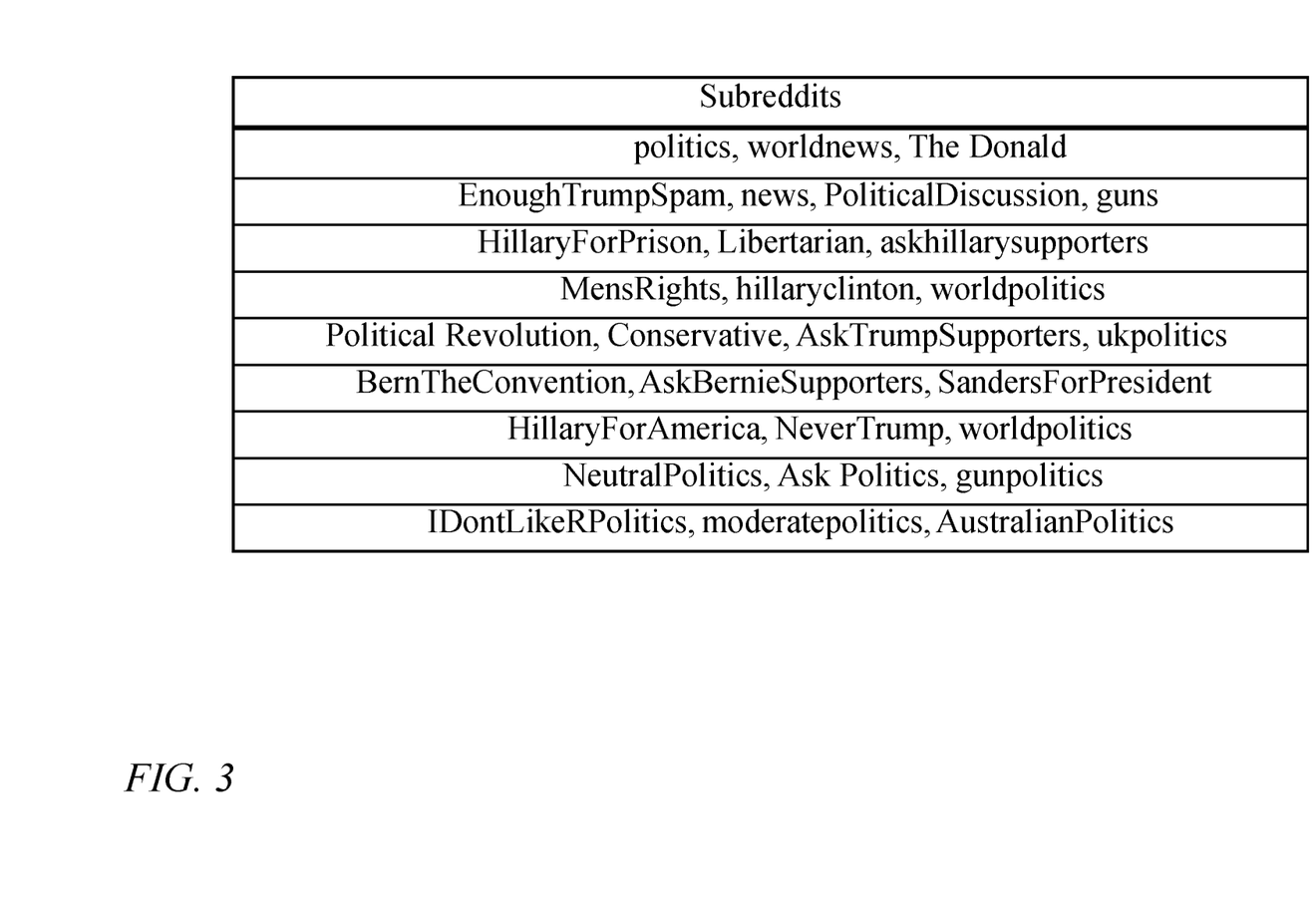
FIG. 3 is a table of discussion topics, according to an embodiment of the present disclosure.

The preprocessed data may be fitted, at 120, by a topic model (i.e., a method according to some embodiments may include fitting the comments with a topic model). Topic modeling may be used to discover latent "topics" occurring in a collection of documents or comments. To model the topics inherent in comment data, some embodiments use Latent Dirichlet Allocation (LDA) (discussed in further detail below, and described in D. M. Blei, A. Y. Ng, and M. I. Jordan. Latent Dirichlet allocation. Journal of Machine Learning Research, 3:2003, 2002, which is incorporated herein by reference). The number of topics k is an input parameter for the model. The topic model may (i) generate k topics, (ii) associate with each topic one or more words, and (iii) assess, for each comment in the data set (i.e., for each of the m comments), the degree to which the comment fits into each topic. The inputs to the topic model may be (i) a plurality of comments and (ii) a value for k, k being the number of topics to be identified. The comments may be sorted into topics, based on the assessment, of the topic model, of the extent to which each comment fits into each topic. FIGS. 2A-2C illustrate these concepts, with FIG. 2A showing a plurality of topics (each labeled "T"), FIG. 2B illustrating a plurality of messages classified as belonging to one of the topics, and FIG. 2C showing the contents of a message.

For example, a researcher may wish to sort a plurality of postings, on a discussion forum for discussing automobiles, into a plurality of topics, and it may be the researcher's goal to have each topic correspond to a particular model of automobile (e.g., models named "Model A", "Model B", "Model C" and the like). To attempt to accomplish this, the user may download the entire set of postings (e.g., m postings), and pre-process the downloaded postings as described above, forming a corresponding set of three-tuples, each three-tuple including (i) the user ID of the forum user (or "posting user") who posted the comment, (ii) the date and time of the posting of the comment, and (iii) the comment. Each comment string may also be filtered to remove punctuation and stop words.

The set of comments may then be fed to a topic model, such as LDA, along with a value for k, the number of topics for which LDA is to create a model. For example, if 26 models of automobile are discussed in the forum ("Model A" through "Model Z") the user may specify, when running LDA, that 26 topics are to be used to create the model (i.e., the user may specify that k=26). LDA may then produce, as output, (i) a set of m topic vectors, each having k elements (or "components"), and (ii) k sets of words, each set of words including M words (where M is 30 by default in LDA, and where M may be overridden by the user, with a different value, when running LDA). Each topic vector may be an ordered set of numbers (e.g., an ordered set of k numbers), each of which may be referred to as an "element" of the topic vector, or, equivalently, as a "component" of the topic vector. In some circumstances, it may be advantageous for the user to specify a larger number of topics. For example, if in the example above some of the comments are not related to any particular model of automobile, then specifying a larger number of topics may enable the topic model to place such comments in a separate topic.

The user may be able to infer from the set of words associated with each topic what the subject matter of the topic is. For example, if the Model A is a convertible, and the list of words for the first topic contains "A", and "convertible", the user may infer that the first topic is associated with the model A. Similarly, if the Model B is a van, and the list of words for the second topic contains "B", and "van", the user may infer that the second topic is associated with the Model B.

The value of k may be chosen based on data-specific considerations, including the quality and cohesiveness of the results and visualization constraints. Testing may be useful in selecting a suitable value for k. For example, if the user, unaware that 26 models of automobile are discussed in the forum, were to set k equal to five, the user might find that each of the five groups of words generated by LDA contained words relevant to more than one model, with, e.g., one topic including "A", "B", "convertible" and "van". If the user were to set k equal to 100, the user might find that the word lists for several topics contained both "A" and "convertible", suggesting that LDA was subdividing a topic related to the Model A (e.g., into sub-topics corresponding to different model-year ranges). In some embodiments a value of k between 30 and 75 is used, to avoid the consequences of k being too large or too small.

In addition to generating k groups of words, LDA may assign (as mentioned above), to each comment, a vector, referred to as a "topic vector", having k elements (or "components"), each element representing the degree to which the comment fits into the corresponding topic. A comment that discusses one model, e.g., the Model A, exclusively may then be assigned a vector, by LDA, having a large value (e.g., 0.8) in the element corresponding to the topic corresponding to the model discussed (e.g., the Model A), and small values in the elements corresponding to other topics. A comment that compares the features, advantages, and flaws of seven different models may have an intermediate value (e.g., 0.1) in each of the elements corresponding to the topics corresponding to the seven models, and small values in the elements corresponding to other topics. All of the topic vectors may have the same 1-norm, i.e., the sum of the elements of each topic vector may be the same (e.g., 1).

In addition to a topic analysis, a sentiment analysis on each comment may be performed, at 125. In general, a sentiment analysis model may calculate a sentiment score for each comment, e.g., determine the commenter's attitude, toward a topic discussed in the comment, as positive (favorable), negative (unfavorable), or neutral. The sentiment analysis model may use a sentiment lexicon, which may be a list of words or other lexical features (e.g., emoticons or acronyms) having significant sentiment connotation. Each word in the sentiment lexicon may have a "valence score" associated with it, each valence score being an indication of the extent to which the lexical feature has a favorable or unfavorable connotation. For example, the word "good" may have a valence score of 1.9, the word "horrible" may have a valence score of −2.5, and a frowning emoticon may have a valence score of −2.2. The sentiment analysis model may sum the valence scores and normalize the sum (e.g., by multiplying by a constant, and dividing by the number of valence scores summed), e.g., to be between −1 (most negative) and 1 (most positive).

The sentiment analysis model may further include rules, or "heuristics" for taking into account characteristics of a comment (other than the presence of words that are in the sentiment lexicon) that may provide further signals of sentiment. For example, the presence of one or more exclamation marks in a comment may cause the sentiment analysis model to increase the magnitude of the intensity of the sentiment (i.e., inferring a more strongly favorable sentiment for a comment that would, in the absence of exclamation marks, be favorable, and inferring a more strongly unfavorable sentiment for a comment that would, in the absence of exclamation marks, be unfavorable). Capitalization, and certain degree modifiers (e.g., the word "extremely") may similarly be used by the sentiment analysis model increase the magnitude of the intensity of the sentiment. Some degree modifiers (e.g., "marginally") may be used by the sentiment analysis model to decrease the magnitude of the intensity of the sentiment. The contrastive conjunction "but" may be interpreted, by the sentiment analysis model, to signal a shift in sentiment polarity, with the sentiment of the text following "but" being dominant. The sentiment analysis model may also have a rule for taking negation into account, e.g., in sentences such as "the handling of the Model A is not good", which, in the absence of such a rule, might be analyzed as expressing favorable sentiment.

The sentiment analysis model may be fed the filtered comments (e.g., the comments produced by the filter 115), or, in some embodiments, the sentiment analysis model is fed the unfiltered comments (e.g., the comments produced by the parser 110) as some features removed by the filter (e.g., punctuation) may in some cases be helpful to the sentiment analysis model. Each option is shown as a respective dashed line in FIG. 1.

The outputs of the topic model and of the sentiment analysis model may be fed to an opinion dynamics analyzer 130, which may derive a time series of sentiment for each topic. To accomplish this, the opinion dynamics analyzer 130 may merge (i) the output of the parser 110, (ii) the topic vectors generated by the topic model 120, and (iii) the sentiment scores generated by the sentiment analysis model 125, to create a new data set (derived data 135) of m tuples, each corresponding to one of the m postings, and each including a topic vector, a time and date of posting $t_i$, a user ID $u_i$, and a sentiment score $s_i$. In mathematical notation, the new data set may be written $Y=(u_i, t_i, v_i, s_i)$, where i ranges from 1 to m, each $v_i$ is a k-dimensional topic vector with a 1-norm of 1, and $s_i$ is a sentiment score such that $s_i \in [-1,1]$. In particular, the dynamics analyzer 130 may, for each posting of the m postings, create a tuple, consisting of (i) the user ID $u_i$ associated with the posting, (ii) the time and date of the posting $t_i$, (iii) the k-dimensional topic vector $v_i$ assigned to the comment of the posting by the topic model, and (iv) the sentiment score $s_i$ calculated for the comment of the posting by the sentiment analysis model.

The topic vectors may be used to sort the postings by topic. For example, any posting having a topic vector with a maximum element greater than a weight threshold may be classified as belonging to the topic corresponding to the maximum element. Any posting having a topic vector with a maximum element less than the weight threshold may be deemed unclassifiable (i.e., omitted from the classification). In the examples mentioned above, this sorting method may have the effect of sorting the posting containing a comment that discusses the Model A into a topic associated with the Model A (because this posting may have, as mentioned above a value of 0.8 in in the element corresponding to the topic associated with the Model A), and of deeming the comment that compares the features, advantages, and flaws of seven different models to be unclassifiable. The weight threshold may be between 0.1 and 0.6, for example, to avoid the consequences (e.g., (i) classifying, into various topics, a large number of postings that do not fit well into any topic, as may occur if the weight threshold is too small, or (ii) needlessly rejecting, as unclassifiable, a large number of postings each of which fits well into a topic, as may occur if the weight threshold is too large) of using a too large or too small a weight threshold.

The tuples classified into any one topic may then be sorted in time order, and graphed as one or more time series. For example, three time series may be superimposed in a single graph: (i) a first time series of the volume of comments (e.g., the number of comments per day) that are positive (e.g., having a sentiment score greater than a first sentiment threshold (e.g., greater than 0.3)), (ii) a second time series of the volume of comments that are negative (e.g., having a sentiment score less than a second sentiment threshold (e.g., less than −0.3)), and (iii) a third time series of the volume of comments that are neutral (e.g., having a sentiment score less than the first sentiment threshold and greater than the second sentiment threshold). In other embodiments, a running average sentiment (e.g., averaged over a running 24-hour period) may be graphed, for one or more of the k topics, or the calculated sentiment score of each comment in a topic may be graphed, as a function of time.

Control signals may be generated from the sentiment data by a control signal generator 140. Some embodiments may be used for campaigns in areas such as (i) public relations (PR), (ii) advertising, and (iii) influence detection. For example, fluctuations in negative sentiment dynamics surrounding a topic or product may be monitored to initiate a public relations (PR) campaign when a measure of sentiment (e.g., an average sentiment) meets a criterion (e.g., exceeds a threshold, or falls below a threshold). Given derived data Y, a topic t, a time period [T1, T2], and an average sentiment threshold S, if the aggregate (or average) negative sentiment in the time period for the topic falls below the average sentiment threshold S (which may have a negative value, e.g., −0.8), then a PR campaign may be initiated in order to "control" or steer the sentiment toward a more positive position. For example, news reports of a safety defect in Model A automobiles may result in a number of negative comments related to the Model A, to which the topic model may assign vectors resulting in their being classified in a topic related to the Model A, and to which the sentiment analysis model may assign negative sentiment. The system may periodically calculate a running average of sentiment for the topic associated with the Model A, and it may trigger remedial action (e.g., by direct public messaging or by sending an email to a person responsible for public relations) when the average sentiment falls below the average sentiment threshold. In other embodiments, action may be taken when the average sentiment exceeds a threshold (which may be the same as or different from the average sentiment threshold S), and, in either case, the action taken may involve attempting to strengthen an observed trend or attempting to counteract it. For example, the observation that sentiment about a product has become unusually favorable may be used to trigger a marketing campaign designed to increase sales, based on the already favorable sentiment, or the observation that sentiment about a political opponent has become unusually favorable may trigger a negative advertising campaign, deployed in an attempt to arrest the opponent's momentum.

In some embodiments the control signal generator may perform analysis of the sentiment data other than, or in addition to, checking for whether the average sentiment has exceeded or fallen below a threshold. For example, in some embodiments the criterion for taking action (e.g., for taking remedial action such as initiating a public relations campaign) may be deemed to have been met when a ratio of a current sentiment to a past sentiment (e.g., a sentiment one week or one month in the past) exceeds, or falls below, a threshold, or when the ratio of (i) the difference between the current sentiment and the past sentiment to (iii) the sum of the current sentiment and the past sentiment exceeds, or falls below, a threshold. In some embodiments the criterion is deemed to have been met when the difference between the current sentiment and the past sentiment exceeds (for an increase in sentiment score) the standard deviation calculated over a set of previously calculated sentiment scores (e.g., a standard deviation over the 100 most recently calculated sentiment scores), or (for a decrease in sentiment score) when the difference between the current sentiment and the past sentiment is a negative number less than the opposite of the standard deviation.

Given the signals generated by the control signal generator 140, the system may initiate a public messaging campaign using a public messaging manager 145 to steer sentiment in the desired direction. In some embodiments, the public messaging manager 145 uses text generator SentiGAN (described, for example, in Wang, Ke, and Xiaojun Wan. "SentiGAN: Generating Sentimental Texts via Mixture Adversarial Networks." *IJCAI*. 2018, which is incorporated herein by reference) to generate a number of text messages related to the desired topic and sentiment for public consumption. SentiGAN is a deep learning framework that learns to produce sentimental text messages by using mixture adversarial networks. SentiGAN uses multiple generators and one multi-class discriminator to train on user-provided data related to the given topic. Such data may include a plurality of messages each having a selected sentiment (e.g., strongly favorable), or each having one of a set of sentiments, with the training data being pre-classified according to the sentiment each message has. Based on its training, the system is able to produce text of the desired sentiment. The system can either send messages directly to individuals specified by the user or, in high-stakes situations, provide the end user with a set of messages that can be verified and sent out by humans.

The sending of messages in the public message campaign may be to a set of mail addresses (e.g., the user may have access to email addresses used by posting users when setting up accounts on a discussion forum), or messaging systems (for sending messages to other participants, or for making public postings) provided by certain social media platforms may be used.

Similarly, standard time series models such as the Autoregressive Integrated Moving Average model (ARIMA) (described, for example in Adhikari, Ratnadip, and Ramesh K. Agrawal. "An introductory study on time series modeling and forecasting." arXiv preprint arXiv:1302.6613 (2013), which is incorporated herein by reference) may be implemented in the control signal generator 140 and may use the derived data to model opinion dynamics and forecast future changes in aggregate opinion. These forecasts may be used to enhance advertising campaigns. For instance, if the models predict that positive sentiment on a topic (assumed advertising related) will rise, then advertisement may be designed to take advantage of that prediction. Sudden or unexpected fluctuations in sentiment dynamics surrounding a given topic may be indicative of coordinated influence campaigns. Some embodiments may be used to track sentiment over time, allowing the system's user to flag unexpected changes in sentiment as an early warning sign of external interference or influence.

FIGS. 3 and 4A-4C relate to a reduction to practice, in one embodiment, using data obtained from the website Reddit. Reddit is a social media website, ranking in the top 10 of all websites as measured by traffic. Reddit includes (e.g., consists of) communities, called subreddits, in which users post initial submission posts loosely corresponding to a discussion topic. Other users are then able to reply to these initial submissions, thereby creating "discussion threads". The data includes (e.g., consists of) user level comments, timestamps, and other Reddit-specific metadata. A subset of this data, including (e.g., consisting of) 43 million comments, was selected corresponding to politically themed subreddits, shown in the table of FIG. 3.

Figure 4A:
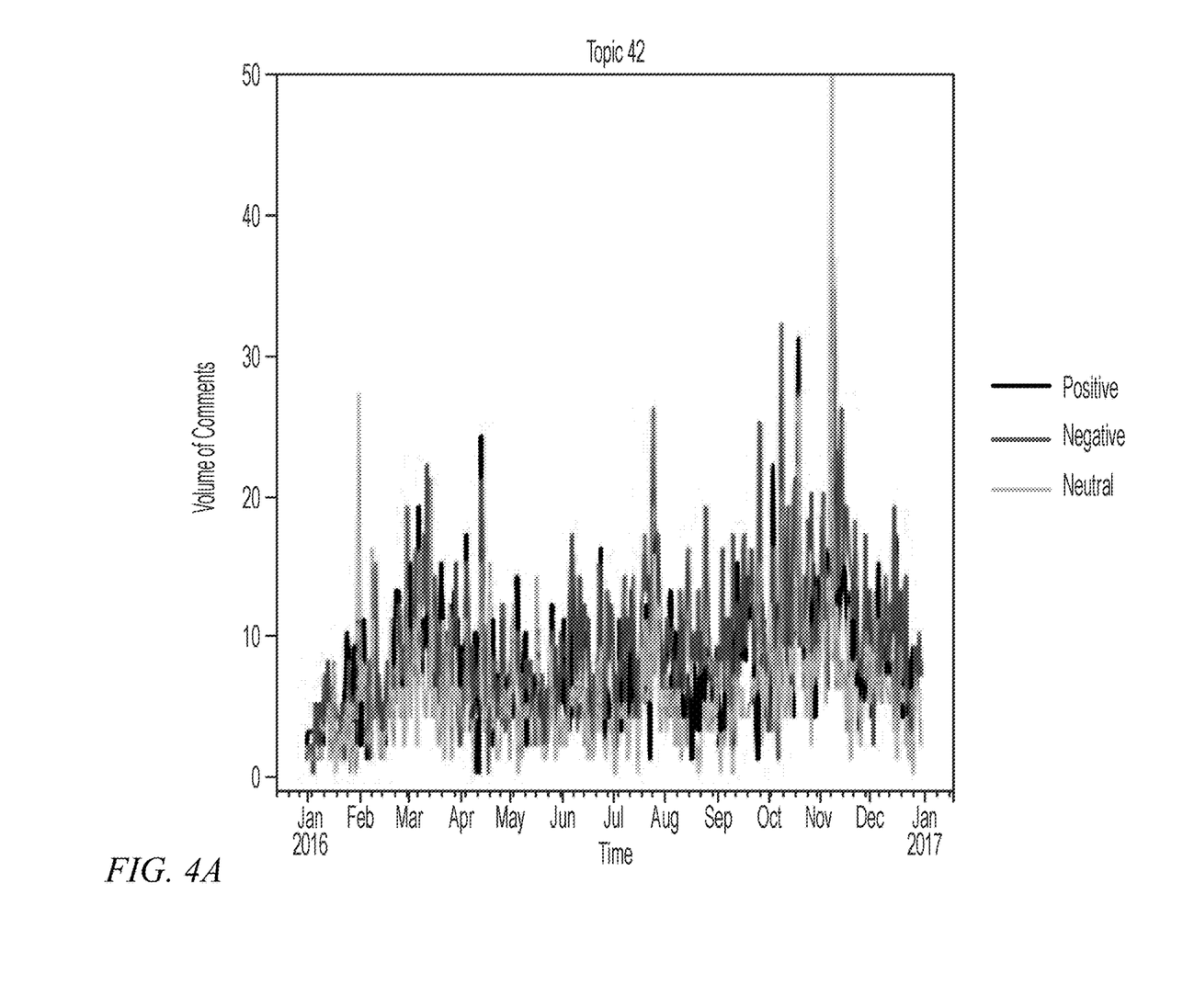
FIG. 4A is a graph of sentiment as a function of time, according to an embodiment of the present disclosure.
Figure 4B:
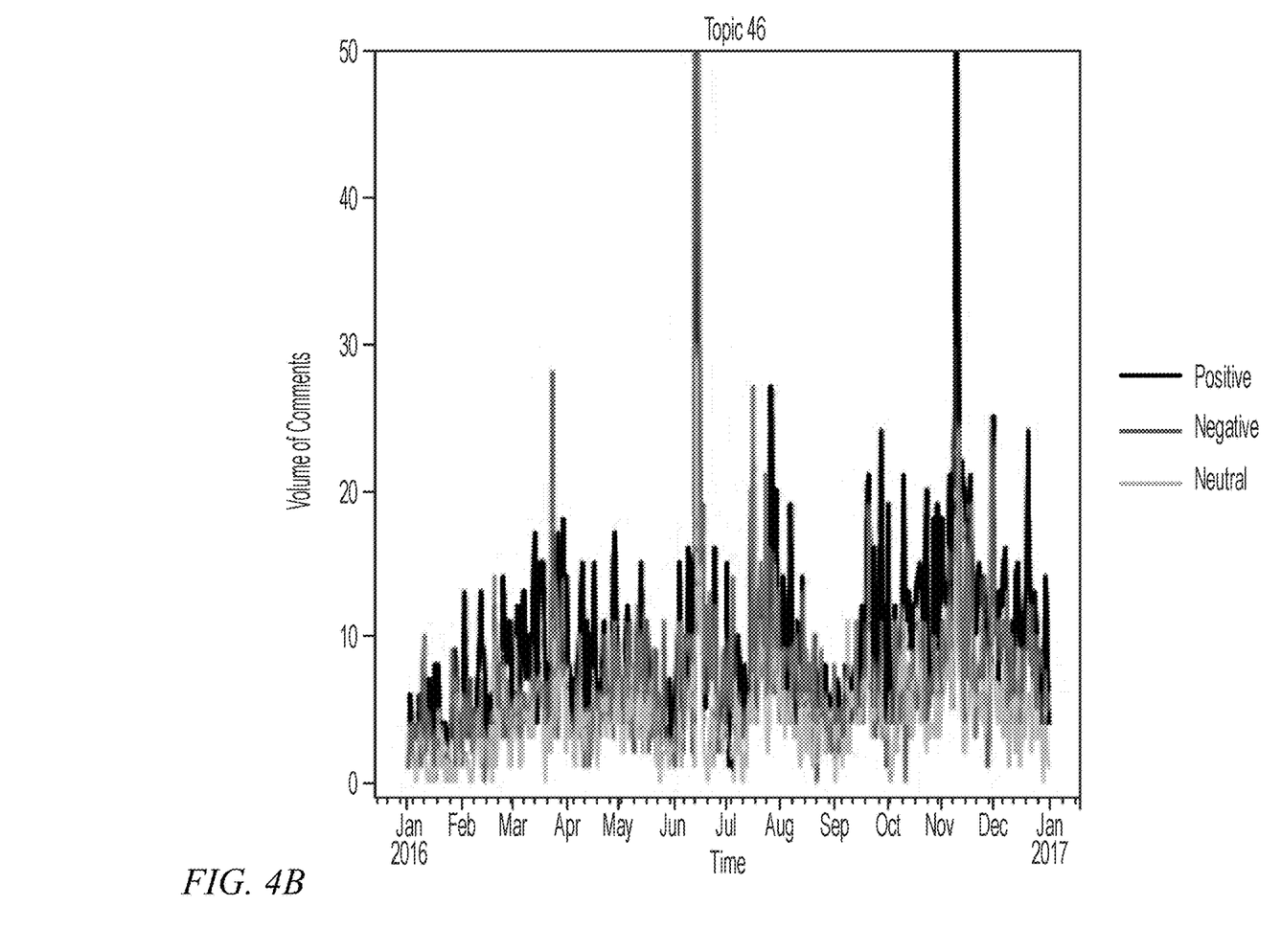
FIG. 4B is a graph of sentiment as a function of time, according to an embodiment of the present disclosure.
Figure 4C:
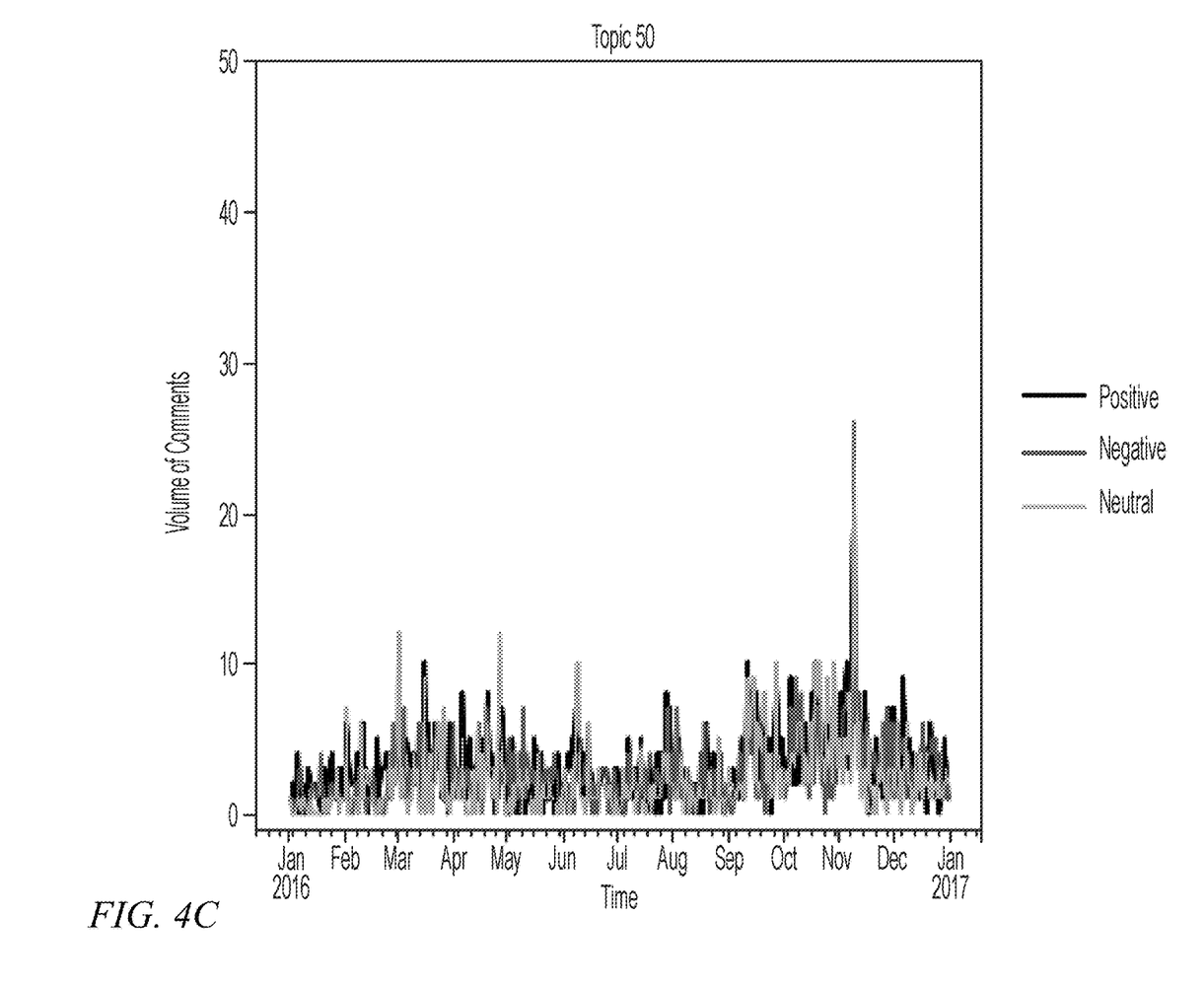
FIG. 4C is a graph of sentiment as a function of time, according to an embodiment of the present disclosure.

Prior to running the LDA topic model (which may be, or be part of, the topic model 120), the Reddit data were preprocessed by removing stop words and punctuation from the comments. LDA was performed using the open source Spark MLLib library (part of Apache Spark 2.4.0). The number of topics was set to k=50 based on human inspection of topic result quality over a few trials (k=30, k=50, and k=75 were tested). The derived data Y was then filtered to tuples where max $v_i$>0.25, (i.e., a weight threshold of 0.25 was used) which selects comments that strongly correspond to some topic and ignores comments that weakly associate to a topic. This parameter was chosen by manually inspecting the quality of comments at various suitable cutoffs. Sentiment analysis (implemented in the sentiment model 125) was performed on each of these comments using Python's VADER sentiment package (described, for example in C. Gilbert and E. Hutto. Vader: A parsimonious rule-based model for sentiment analysis of social media text. Eighth International Conference on Weblogs and Social Media (ICWSM-14), 2014, which is incorporated herein by reference). VADER (Valence Aware Dictionary and sEntiment Reasoner) is a lexicon and rule-based sentiment analysis tool that is specifically attuned to sentiments expressed in social media, and works well on texts from other domains. The dynamics of the topics were visualized by graphing the changes in sentiment frequency, for selected topics, over time, as shown in FIGS. 4A-4C, which show typical dynamics of opinions over time for 3 of the 50 topics. The sentiments associated with these politically-related topics are observed to spike at certain times (e.g., November 2016). These spikes may be correlated with events such as the US 2016 Presidential Election. Given a major change in sentiment (e.g., spike in negative comments or increase in the ratio of negative to positive comments), a control signal can be computed such that if the sentiment (or a function of the sentiment, e.g., a moving average of the sentiment, or a rate of change of the sentiment) exceeds the threshold (or falls below the threshold) an email campaign is conducted. An example of such a spike can be observed in FIG. 4B between the months of June and July.

In some embodiments, some of the methods described herein are performed by a processing circuit. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

Figure 5:
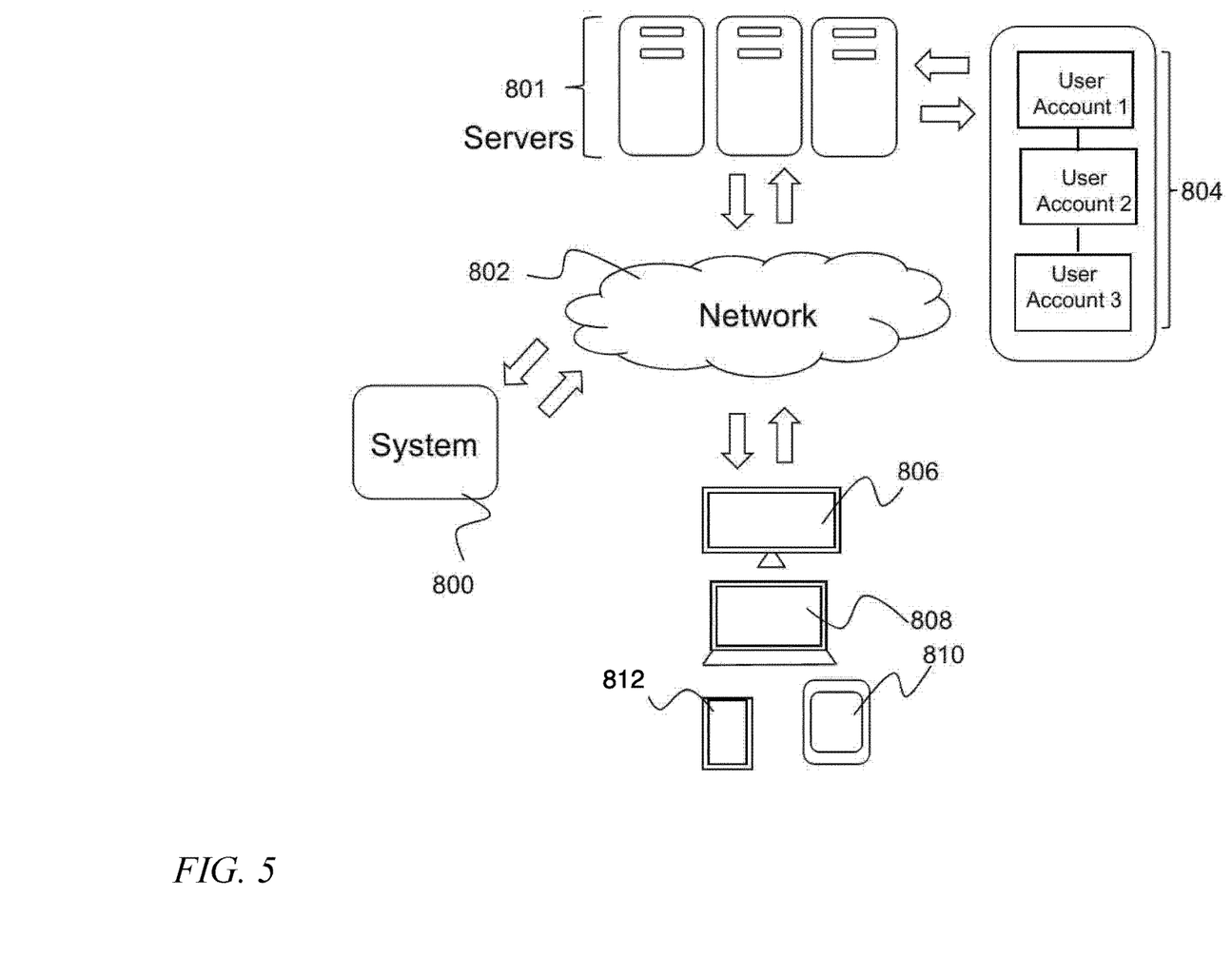
FIG. 5 is a block diagram illustrating various computerized systems communicating with one another which may be used to implement embodiments of the present invention.

FIG. 5 is a block diagram illustrating various computerized systems communicating with one another which may be used to implement embodiments of the present invention.

As shown in FIG. 5, a system 800 according to some embodiments of the present disclosure connects with servers 801 to perform the operations described herein, such as generating a report or sending a message based on the predicted state change. In such an example, the servers 801 could include social media servers. The system 800 connects, via a network 802, to servers 801, to send and receive information relating to various social media networks of interconnected user accounts (element 804) that are accessed via mobile and non-mobile devices, non-limiting examples of which include desktop computers 806, laptop computers 808, smartphones 810, and other mobile devices 812. Non-limiting examples of user accounts (element 804) include Reddit user accounts. As can be appreciated by one skilled in the art, the user device is any device that can receive and transmit data via the network 802. Additionally, a user account may be a user account of a social media platform, which may or may not be capable of receiving targeted marketing. A non-limiting example of the network 802 is the Internet, or a portion of the Internet.

For example, the system 800 may include a processing circuit configured to download social media postings from the servers 801, analyze the postings, and send control signals, in accordance with FIG. 1. In some embodiments, the output of the control signal generator 140 (e.g., emails notifying people, or other electronic systems, of a possible need to take action in response to a change in sentiment detected in the social media postings) may be sent over the network 802. The system 800 may itself include one or more servers, user devices, or, for example, one or more of the elements shown in FIG. 6 (discussed in further detail below).

In other aspects, the servers 801 can be social network platforms or advertisement delivery networks to access information or automatically provide targeted information and/or advertisements to a display screen on a communication device (elements, 806, 808, 810, 812) via a social network account (element 804).

Computers and Other Processing Circuits

Various portions of embodiments of the present invention that refer to the use of a "processing circuit" may be implemented with logic gates, or with any other embodiment of a processing unit or processing circuit. The term "processing unit" or "processing circuit" is used herein to include any combination of hardware, firmware, and software, employed to process data or digital signals.

Figure 6:
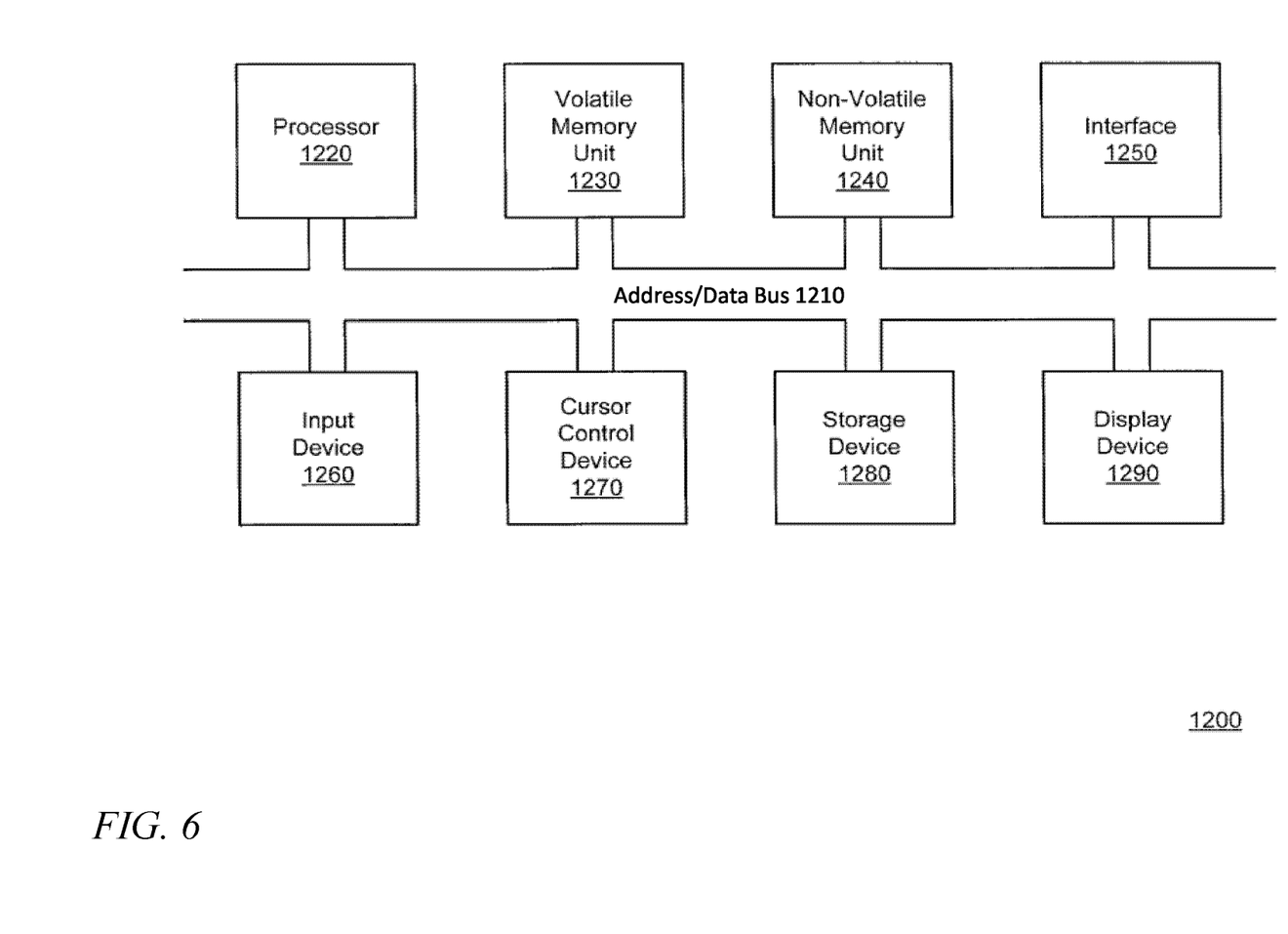
FIG. 6 is a block diagram illustrating a processing system, a processing circuit, or a portion of a processing system or processing circuit used in conjunction with at least one embodiment of the present invention.

FIG. 6 is a block diagram illustrating a processing system, a processing circuit, or a portion of a processing system or processing circuit, referred to herein as a computer system, used in conjunction with at least one embodiment of the present invention.

An exemplary computer system 1200 in accordance with an embodiment is shown in FIG. 6. Exemplary computer system 1200 is configured to perform calculations, processes, operations, and/or functions associated with a program or algorithm. In one embodiment, certain processes and steps discussed herein are realized as a series of instructions (e.g., software program) that reside within computer readable memory units and are executed by one or more processing circuits of exemplary computer system 1200. When executed, the instructions cause exemplary computer system 1200 to perform specific actions and exhibit specific behavior, such as described herein.

Exemplary computer system 1200 may include an address/data bus 1210 that is configured to communicate information. Additionally, one or more data processing unit, such as processing circuit 1220, are coupled with address/data bus 1210. Processing circuit 1220 is configured to process information and instructions. In an embodiment, processing circuit 1220 is a microprocessor. Alternatively, processing circuit 1220 may be a different type of processor such as a parallel processor, or a field programmable gate array.

Exemplary computer system 1200 is configured to utilize one or more data storage units. Exemplary computer system 1200 may include a volatile memory unit 1230 (e.g., random access memory ("RAM"), static RAM, dynamic RAM, etc.) coupled with address/data bus 1210, wherein volatile memory unit 1230 is configured to store information and instructions for processing circuit 1220. Exemplary computer system 1200 further may include a non-volatile memory unit 1240 (e.g., read-only memory ("ROM"), programmable ROM ("PROM"), erasable programmable ROM ("EPROM"), electrically erasable programmable ROM "EEPROM"), flash memory, etc.) coupled with address/data bus 1210, wherein non-volatile memory unit 1240 is configured to store static information and instructions for processing circuit 1220. Alternatively, exemplary computer system 1200 may execute instructions retrieved from an online data storage unit such as in "Cloud" computing. In an embodiment, exemplary computer system 1200 also may include one or more interfaces, such as interface 1250, coupled with address/data bus 1210. The one or more interfaces are configured to enable exemplary computer system 1200 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one embodiment, exemplary computer system 1200 may include an input device 1260 coupled with address/data bus 1210, wherein input device 1260 is configured to communicate information and command selections to processing circuit 1220. In accordance with one embodiment, input device 1260 is an alphanumeric input device, such as a keyboard, that may include alphanumeric and/or function keys. Alternatively, input device 1260 may be an input device other than an alphanumeric input device. In an embodiment, exemplary computer system 1200 may include a cursor control device 1270 coupled with address/data bus 1210, wherein cursor control device 1270 is configured to communicate user input information and/or command selections to processing circuit 1220. In an embodiment, cursor control device 1270 is implemented using a device such as a mouse, a track-ball, a track-pad, an optical tracking device, or a touch screen. The foregoing notwithstanding, in an embodiment, cursor control device 1270 is directed and/or activated via input from input device 1260, such as in response to the use of special keys and key sequence commands associated with input device 1260. In an alternative embodiment, cursor control device 1270 is configured to be directed or guided by voice commands.

In an embodiment, exemplary computer system 1200 further may include one or more optional computer usable data storage devices, such as storage device 1280, coupled with address/data bus 1210. Storage device 1280 is configured to store information and/or computer executable instructions. In one embodiment, storage device 1280 is a storage device such as a magnetic or optical disk drive (e.g., hard disk drive ("HDD"), floppy diskette, compact disk read only memory ("CD-ROM"), digital versatile disk ("DVD")). Pursuant to one embodiment, a display device 1290 is coupled with address/data bus 1210, wherein display device 1290 is configured to display video and/or graphics. In an embodiment, display device 1290 may include a cathode ray tube ("CRT"), liquid crystal display ("LCD"), field emission display ("FED"), plasma display or any other display device suitable for displaying video and/or graphic images and alphanumeric characters recognizable to a user.

Exemplary computer system 1200 is presented herein as an exemplary computing environment in accordance with an embodiment. However, exemplary computer system 1200 is not strictly limited to being a computer system. For example, an embodiment provides that exemplary computer system 1200 represents a type of data processing analysis that may be used in accordance with various embodiments described herein. Moreover, other computing systems may also be implemented. Indeed, the spirit and scope of the present technology is not limited to any single data processing environment. Thus, in an embodiment, one or more operations of various embodiments of the present technology are controlled or implemented using computer-executable instructions, such as program modules, being executed by a computer. In one exemplary implementation, such program modules include routines, programs, objects, components and/or data structures that are configured to perform particular tasks or implement particular abstract data types. In addition, an embodiment provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for analyzing social media data for sentiment have been specifically described and illustrated herein, many modifications and variations will be apparent to those skilled in the art. Accordingly, it is to be understood that a system and method for analyzing social media data for sentiment constructed according to principles of this disclosure may be embodied other than as specifically described herein. The invention is also defined in the following claims, and equivalents thereof.

What is claimed is:

1. A method for issuing control signals in response to sentiment, the method comprising:
   assigning, to each of a plurality of comments, a respective topic vector of length k, k being a positive integer;
   determining whether a largest element of the topic vector of a first comment of the plurality of comments exceeds a weight threshold;
   in response to the determining that the largest element exceeds the weight threshold, classifying the first comment into a first topic, of k topics, the first topic corresponding to the position, in the topic vector, of the largest element of the topic vector;
   calculating a first sentiment score for the first comment;
   calculating an average sentiment score, based in part on the first sentiment score;
   determining whether the average sentiment score meets a criterion; and
   in response to the determining that the average sentiment score meets the criterion, generating a control signal, the control signal comprising a message related to the first topic.

2. The method of claim 1, further comprising:
   classifying a second comment into the first topic; and
   calculating a second sentiment score for the second comment.

3. The method of claim 2, further comprising displaying a graph of sentiment as a function of time for the first topic, the graph including:
   the first sentiment score at a time associated with the first comment, and
   the second sentiment score at a time associated with the second comment.

4. The method of claim 1, wherein the assigning, to each of the plurality of comments, of the respective topic vector of length k, comprises fitting the comments with a topic model.

5. The method of claim 4, wherein the topic model is Latent Dirichlet Allocation.

6. The method of claim 5, wherein k is between 30 and 75.

7. The method of claim 5, wherein the weight threshold is between 0.1 and 0.6.

8. The method of claim 1, wherein the calculating of the first sentiment score for the first comment comprises calculating the first sentiment score with VADER.

9. A system for analyzing sentiment, the system comprising a processing circuit configured to:
   assign, to each of a plurality of comments, a respective topic vector of length k, k being a positive integer;
   determine whether a largest element of the topic vector of a first comment of the plurality of comments exceeds a weight threshold;

in response to the determining that the largest element exceeds the weight threshold, classify the first comment into a first topic, of k topics, the first topic corresponding to the position, in the topic vector, of the largest element of the topic vector; and calculate a first sentiment score for the first comment;

calculate an average sentiment score based in part on the first sentiment score;

determine whether the average sentiment score meets a criterion; and in response to the determining that the average sentiment score meets the criterion, send a message related to the first topic.

10. The system of claim 9, wherein the processing circuit is further configured to:

classify a second comment into the first topic; and calculate a second sentiment score for the second comment.

11. The system of claim 10, wherein the processing circuit is further configured to display a graph of sentiment as a function of time for the first topic, the graph including:

the first sentiment score at a time associated with the first comment, and the second sentiment score at a time associated with the second comment.

12. The system of claim 9, wherein the assigning, to each of the plurality of comments, of the respective topic vector of length k, comprises fitting the comments with a topic model.

13. The system of claim 12, wherein the topic model is Latent Dirichlet Allocation.

14. The system of claim 13, wherein k is an input parameter to the topic model.

15. The system of claim 14, wherein k is between 30 and 75.

16. The system of claim 13, wherein the weight threshold is between 0.1 and 0.6.

17. The system of claim 9, wherein the calculating of the first sentiment score for the first comment comprises calculating the first sentiment score with VADER.

18. A non-transitory computer readable medium upon which are encoded instructions that, when executed by a processing circuit, cause the processing circuit to:

assign, to each of a plurality of comments, a respective topic vector of length k, k being a positive integer;

determine whether a largest element of the topic vector of a first comment of the plurality of comments exceeds a weight threshold;

in response to the determining that the largest element exceeds the weight threshold, classify the first comment into a first topic, of k topics, the first topic corresponding to the position, in the topic vector, of the largest element of the topic vector;

calculate an average sentiment score for a plurality of comments including the first comment;

determine whether the average sentiment score meets a criterion; and in response to the determining that the average sentiment score meets the criterion, send a message related to the first topic.

\* \* \* \* \*